US006165962A

United States Patent [19]

Kaler et al.

[11] Patent Number: 6,165,962

[45] **Date of Patent: *Dec. 26, 2000**

[54] AQUEOUS MICROEMULSIONS

[75] Inventors: Eric W. Kaler, Newark; Timothy Donald Krizan, Wilmington; Larry D. Ryan; Martin Swanson Vethamuthu, both of Newark, all of Del.

[73] Assignees: E. I. du Pont de Nemours and Comapny, Wilmington, Del.; The University of Delaware, Newark, Del.

[ * ] Notice: This patent issued on a continued prosecution application filed under 37 CFR 1.53(d), and is subject to the twenty year patent term provisions of 35 U.S.C. 154(a)(2).

[21] Appl. No.: 09/050,307

[22] Filed: Mar. 30, 1998

Related U.S. Application Data

[63] Continuation-in-part of application No. 08/904,166, Jul. 31, 1997, abandoned.

[51] Int. Cl.[7] .......................... C11D 17/00; C11D 17/08; C09D 9/00

[52] U.S. Cl. .......................... 510/365; 510/201; 510/206; 510/417; 510/432; 510/495; 510/505

[58] Field of Search .................................... 510/365, 417, 510/432, 174, 274, 405, 505, 506, 201, 245, 254, 206, 238, 242, 461, 407, 495; 134/40, 38

[56] References Cited

U.S. PATENT DOCUMENTS

| | | | |
|---|---|---|---|
| 2,606,874 | 8/1952 | Garner et al. | 252/308 |
| 4,781,848 | 11/1988 | Biresaw et al. | 252/49.5 |
| 4,781,849 | 11/1988 | Biresaw et al. | 252/49.5 |
| 4,927,556 | 5/1990 | Pokorny | 252/173 |
| 4,934,391 | 6/1990 | Futch et al. | 134/40 |
| 5,080,822 | 1/1992 | Van Eenam | 252/170 |
| 5,080,831 | 1/1992 | Van Eenam | 252/558 |
| 5,158,710 | 10/1992 | VanEenam | 252/539 |
| 5,374,614 | 12/1994 | Behan et al. | 512/3 |
| 5,585,341 | 12/1996 | Van Eenam | 510/365 |
| 5,597,792 | 1/1997 | Klier et al. | 510/417 |
| 5,691,289 | 11/1997 | Purcell et al. | 510/174 |

*Primary Examiner*—Necholus Ogden
*Assistant Examiner*—Gregory E. Webb

[57] ABSTRACT

A microemulsion comprising: a functionalized hydrocarbon, an anionic surfactant, a diol having from 2 to 10 carbon atoms and water.

16 Claims, 2 Drawing Sheets

AQUEOUS MICROEMULSIONS

This application is a continuation-in-part of the earlier filed and application Ser. No. 08/904,166 filed on Jul. 31, 1997, now abandoned.

The present invention relates to microemulsions which remain stable when mixed with a variety of organic solvents and thickening agents making them particularly useful in cleaning applications involving the removal of grease, oils, paint films and other difficult to remove organic materials.

BACKGROUND OF THE INVENTION

Cleaning compositions and methods for removing water insoluble organic materials which employ dibasic ester solvents are known in the art. For example, U.S. Pat. No. 's 4,934,391 and 4,927,556 teaches emulsions of dibasic esters and water, but generally, simple emulsions lack the stability to remain dispersed over long periods of time.

U.S. Pat. No. 's 5,080,831 and 5,080,822 teach true solutions of non-hydrocarbon and non-hydrogenated hydrocarbon organic solvents having water solubilities of from 0.2 to 6% in a combination of water and a solubilizer.

U.S. Pat. No. 5,158,710 teaches a microemulsion of non-hydrocarbon and non-hydrogenated hydrocarbon organic solvents having water solubilities of from 0.2 to 6% with a solubilizing additive, a builder and optionally a coupler. In this patent the builder is a material that enhances the cleaning efficiency of the surfactant by inactivating water hardness, supplying alkalinity to assist in cleaning and buffering the pH of the composition so that it remains above 7.

Other patents relating to emulsions and/or microemulsions include U.S. Pat. No. 5,597,792 which teach an oil continuous microemulsion of water, organic solvents and a surfactant; U.S. Pat. No. 2,606,874 which teaches a hydrocarbon oil emulsion using a C7 or higher alkanediol; and U.S. Pat. No. 's 4,781,848 which teaches hydrocarbon microemulsions for metal roll forming.

Microemulsions have properties that make them attractive for consideration in the formulation of cleaning products. The object of the present invention is to provide a microemulsion characterized in that it has a wide range of compositional and thermal stabilities and that can, without loss of identity as a microemulsion, be combined with solvents and additives for formulation into various cleaning compositions.

SUMMARY OF THE INVENTION

The present invention provides a microemulsion comprising:

(a) water, (b) a functionalized hydrocarbon, (c) an anionic surfactant, and (d) a diol having from 2 to 10 carbon atoms wherein the functionalized hydrocarbon is sparingly soluble in water over the entire stability range of the microemulsion and present at an amount in excess of its water solubility and the surfactant is a sulfosuccinate. The diol of preference is 1,2-hexanediol and the preferred surfactant is sodium bis(2-ethylhexyl)sulfosuccinate.

The microemulsion of the present invention may further comprise an organic solvent, the organic solvent being mixed with the microemulsion to form a mixture wherein the weight ratio of microemulsion to organic solvent is such that the mixture is a microemulsion.

The present invention provides cleaning compositions formulated from the microemulsion alone or the microemulsion mixed with an organic solvent(s) and/or other additives. In mixtures of the microemulsion with organic solvents or thickeners, the microemulsion retains its stability.

DETAILED DESCRIPTION

Figure 1:
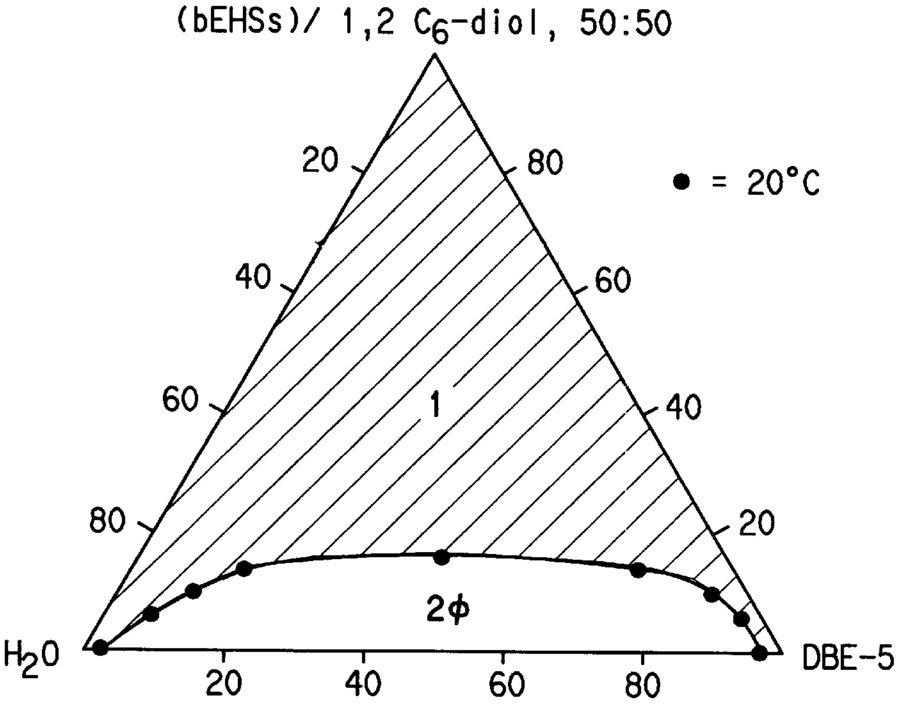
FIG. 1 shows a pseudo ternary phase diagram representing a microemulsion of the present invention where the weight ratio of surfactant to diol is $^{50}/_{50}$.

The term microemulsion, as used herein, means a single phase, microstructured equilibrium mixture of at least three components. Two of the three components of the microemulsion are sparingly soluble one in the other, for example oil and water or oil and a polar solvent. The third component is a substance which functions to solubilize one of the first two in the other, for example oil in water or water in oil. The third component may be an amphiphile, that is a molecule containing both hydrophilic and lipophilic moieties. A microemulsion appears clear to the eye, but it is not a solution. A microemulsion may be stable over a wide range of temperatures and concentrations with no loss in function or stability. Furthermore, microemulsions may be distinguished from solutions in that they are microstructured and may contain "oil"-swollen micelles, a bi-continuous structure, water-swollen inverse micelles or other structures depending on the amount of "oil" in the system. True solutions show none of these microstructural characteristics. The term "oil" as used in the definition above means the organic, non-surfactant, component of the microemulsion. Generally, microemulsions may show Tyndall scattering and have low interfacial tensions.

A microemulsion is not an emulsion, and is distinguished from an emulsion in that the microemulsion is thermodynamically stable, that is at its lowest energy state, while an emulsion is only kinetically stable, that is the rate at which the emulsified phase is separating from the water is very slow. Although an emulsion may be stable for days, months or even longer, it will become unstable with time and separate into a layered mixture.

Microemulsions have the following identifying characteristics: they are easily prepared by gentle mixing or shaking the components together; they are thermodynamically stable and will not separate into separate phases or settle out, as long as they retain their chemical identity, without some change in temperature; and if they become unstable because of a change in the temperature, the microemulsion is easily restored by heating or cooling the mixture until it is again at a temperature within the range of the microemulsion's thermodynamic stability.

The formation of a microemulsion generally involves the two mutually insoluble or sparingly soluble substances and a surfactant or surfactant/co-surfactant mixture. The formation of a microemulsion may be proved by any one of the following test methods: Tyndall scattering, dynamic light scattering, X-ray scattering, and small angle neutron scattering; all well known scattering techniques. Other important methods include conductivity, NMR and fluorescence techniques described in *Surfactant Solutions, New Methods of Investigation,* R Zana, ed., Marcel Dekker, New York, 1987 and "Microemulsions", *Ber. Bunsenges Phys. Chem.,* 100, 181(1996) No. 3.

As used herein, the term surfactant means a surface active substance of an anionic, cationic or nonionic type which lowers the surface tension of water.

As used herein the term functionalized hydrocarbon means a hydrocarbon molecule having substituted for at least one hydrogen, or in the case of heterocyclic compounds substitution for at least one carbon, a group containing at least one non-carbon atom, at least one non-hydrogen atom or non-halogen atoms. Such groups include those having oxygen, nitrogen, sulfur, and/or phosphorous atoms present, for example, acids, esters, ethers, amines, amides, ketones, nitriles, nitro functional organic compounds, aldehydes, alcohols, organic carbonates, organic phosphates, organic sulfoxide and heterocyclic compounds having oxygen or nitrogen incorporated into the ring structure.

Preferred functionalized hydrocarbons which form the microemulsions of the present invention include esters, diesters, triesters, tetraesters, acetates and diacetates, and lactones. Of these, the functionalized hydrocarbons preferred for formulating cleaning compositions are the dibasic esters.

The functionalized hydrocarbon of the present invention is sparingly soluble in water. By sparingly soluble is meant that the solubility of the functionalized hydrocarbon in water is less than 10% by weight, and conversely the solubility of water in the functionalized hydrocarbon is less than 10% by weight.

Surfactants useful in the microemulsions of the present invention are anionic sulfosuccinates. Preferred surfactants are sodium salts of bis(2-ethylhexyl)sulfosuccinate, (bEHSs), di(1,3-dimethyl-butyl)-sulfosuccinate, and diamylsulfo-succinate. These surfactants are available commercially neat or in solution form (in alcohol or water) under the AEROSOL trademark of Cytec, Inc. of West Patterson, N.J. as AEROSOL-OT (AOT) or AEROSOL-GPG, AEROSOL-MA-80 (MA-80) and AEROSOL-AY (AY), respectively. Another source of surfactant is MACKANATE DOS-75 (MACKANATE is a trademark of the McIntyre Group Ltd. of University Park, Ill., and the DOS-75 product is a mixture of sodium bis(2-ethylhexyl)sulfosuccinate, water, ethanol and propylene glycol). Among these various surfactants, bEHSs is most preferred followed in order by sodium diamylsulfosuccinate and sodium di(1,3-dimethylbutyl)-sulfosuccinate.

Diols useful in the present invention are those diols having from 2 to 10 carbons and preferably having the OH groups present in the 1,2 positions. The diols may be linear or branched and include a functionality in addition to the OH groups. Useful diols include 1,2-butanediol, 1,2-pentanediol, hexanediols, octanediols, 1,2,3-propanetriol monoacetate, heptanediols, decanediols, neopentyl glycol, 2-methyl-2,4-pentanediol (commonly known as hexylene glycol) and 2-methyl-1,3-propanediol.

The function of the diol in the present invention is particularly surprising in the case of 1,2-hexanediol and bEHSs since the corresponding alcohol, hexanol, shows no synergy in combination with the surfactants of the present invention. However, synergy does exist between the lower chain alcohols and the surfactant. This is of particular importance since many commercially available surfactants are sold as solutions in lower chain alcohols.

The inclusion of the diol in the microemulsions of the present invention provides a microemulsion having a greater range of thermal stability at a lower concentration of surfactant. Practical microemulsions of the present invention may be formulated at lower levels of volatile organic content (VOC) and at higher flash points than known solution or emulsion products. This is of particular interest when the microemulsion is used in formulating cleaning compositions. These microemulsions are stable over the temperature range of from at least 5° C. to a temperature of about 100° C.

An important advantage of the microemulsions of the present invention are that they may be diluted with organic solvents without loss of function or stability, that is the mixture of the microemulsion and the solvent is also a microemulsion. Such diluted microemulsions also have wide ranges of temperature stability resulting from the presence of the diol. These diluted microemulsions are of special interest in formulating efficient cleaning compositions.

Organic solvents that may be used in diluting the microemulsions of the present invention are solvents selected from the group consisting of alcohols, ketones, esters, acyclic amides, cyclic amides, glycol ethers, acetates, glycol ether acetates, lactones, sulfoxides, cyclic carbonates, aromatic hydrocarbons, terpenes, N-methylpyrrolidone and other N-alkyl pyrrolidones, dimethylpiperidone, dipropylene glycol monomethyl ether, propylene carbonate, alkylbenzenes, d-limonene and mixtures of any combination of these compounds. Preferred organic solvents include N-methylpyrrolidone; dimethyl piperidone; ethylene and propylene glycol based ethers and their esters, such as propylene glycol methyl ether acetate; propylene carbonate; alkyl acetates such as those sold under the EXXATE trademark of EXXON (Houston, Tex.); alkyl esters of phthalic acid; water immiscible ketones; d-limonene; ester-alcohols such as those sold under the TEXANOL trademark of Eastman Chemical Company (Kingsport, Tenn.); xylene, and other alkyl benzenes and mixtures of alkyl benzenes such as Aromatic 100, 150 and 200 sold by EXXON(outside of the United States "Aromatic" is known as "Solvesso").

The functionalized hydrocarbons of the present invention include dibasic esters preferably those esters of adipic, glutaric and succinic acids and alcohols having from 1 to 12 carbons and mixtures of these esters. Of particular interest are the dimethyl esters of adipic, glutaric and succinic acids and mixtures of these esters and the esters of 2-ethyl succinic acid and 2-methyl glutaric acid. (Dimethyl adipate, dimethyl glutarate, dimethyl succinate are sold individually and as mixtures under the DBE product name by E. I. DuPont de Nemours, Inc., located in Wilmington, Del.) DBE mixtures include DBE, a mixture of each of the three esters with the major component being dimethyl glutarate; DBE-2, a mixture of dimethyl adipate in dimethyl glutarate; DBE-3, a mixture of dimethyl glutarate in dimethyl adipate; DBE-4, dimethyl succinate; DBE-5 dimethyl glutarate; DBE-6, dimethyl adipate; DBE-9 dimethyl glutarate in dimethyl succinate, and DBE-IB, a mixture of diisobutyl esters adipate, glutarate and succinate.

The microemulsions of the present invention are of particular interest in the formulation of cleaning compositions and especially those containing the dibasic esters. Microemulsions offer advantages as cleaning compositions over solutions and two phase emulsions. Microemulsions have greater stability and the unique property in the ease of re-forming with heating or cooling if the microemulsion is broken due to changes in storage temperatures. Microemulsions may have better cleaning power than emulsions or solutions in given situations and may be formulated at lower VOC and sometimes lower costs than true solutions.

Cleaning applications for which the microemulsions of the present invention are of use include metal cleaning, degreasing and paint stripping. The term cleaning composition includes, for example, compositions for degreasing and paint stripping.

A cleaning composition of the present invention may be formulated by mixing the microemulsion of the present invention with a organic solvent and optionally a thickener. Thickeners that may be used in this formulation include unmodified and hydrophobically modified cationic cellulose ether polymers, polyurethanes and polyacrylic acids and polyacrylics. Inorganic thickeners may also be used. For example, layered hydrous magnesium silicates sold as LAPONITE, a trademark of Southern Clay Products of Gonzales, Tex. is useful in the present invention. A preferred organic thickener is a polyacrylic acid thickener sold under the B. F. Goodrich trademark PEMULEN. Useful diols in the formulating of cleaning compositions are 2-methyl-1,3-propanediol, 2-methyl-2,4-pentanediol and neopentyl glycol.

TEST METHODS

Phase boundary determination and construction of the phase diagrams: Samples were prepared by individually weighing the water (A), DBE (B), bEHSs (C), and $C_n$-diol (D) into graduated cylinders having sealable closures and magnetic stirring bars. The samples were sealed, and the graduated cylinders were placed in a constant temperature bath(s). Samples were then equilibrated in constant-temperature baths to within ±0.05° C. of the desired temperature. While the samples were coming to thermal equilibrium, they were stirred using the stirring bars to agitate the mixtures.

Once equilibrated to temperature of interest, the stirring was stopped, and the samples were allowed to stand so that any phase separation could occur before visually observing and recording the phase behavior(evidence of more than one phase). After observing the phase behavior, the samples were then removed from the temperature bath and allowed to return to room temperature. On becoming equilibrated to room temperature, the sample containers were opened and components were added from stock solutions to make the next concentration to be examined. This process was continued until the sample mixture in the cylinder became too large to be properly stirred or equilibrated.

The phase boundary was determined ±0.1° C., and the numerical average of the temperature before and after the phase boundary crossed was used as the boundary point.

The present invention is illustrated by the following non-limiting examples.

EXAMPLES

Example 1

Mixtures of 1,2-hexanediol, water, DBE-5 and bEHSs were made as described in the method for determination of phase boundary.

The data collected is shown in the Figures. In the Figures, $\alpha=B/(A+B)$; $\delta=D/(C+D)$ and $\gamma=(C+D)/(A+B+C+D)$. According to standard practice A is the mass of water, B is the mass of the functionalized hydrocarbon, C is the mass of the surfactant, and D is the mass of the diol in the mixture. These ratios are oftentimes expressed as percents.

FIG. 1 shows the microemulsion of the present invention at 20° C. for a composition containing water, DBE-5 and a mixture of bEHSs and 1,2,hexanediol at a weight ratio of 50:50. The region of the microemulsion is the larger shaded portion of the pseudo ternary phase diagram. Although this data is presented for a specific microemulsion, it is representative of the compositions of the present invention, that is mixtures of other functionalized hydrocarbons, surfactants and diols with water. The actual weight percentages of the components of the microemulsion will vary with specific combinations of functionalized hydrocarbon and the selected sulfosuccinate surfactant and diol combinations. Microemulsions of the present invention are stable over a wide temperature range. By varying the relative concentrations of the 4 components, microemulsions may be formulated having stabilities over the entire temperature range of from about 5 to about 100° C. or having stabilities within any range of temperatures between about 5 and 100° C. The temperature range is limited to 5 to 100° C. only at atmospheric pressure. At higher pressures, the range of stability of the microemulsion is extended beyond this temperature range at both the upper and the lower temperature limits.

Figure 2:
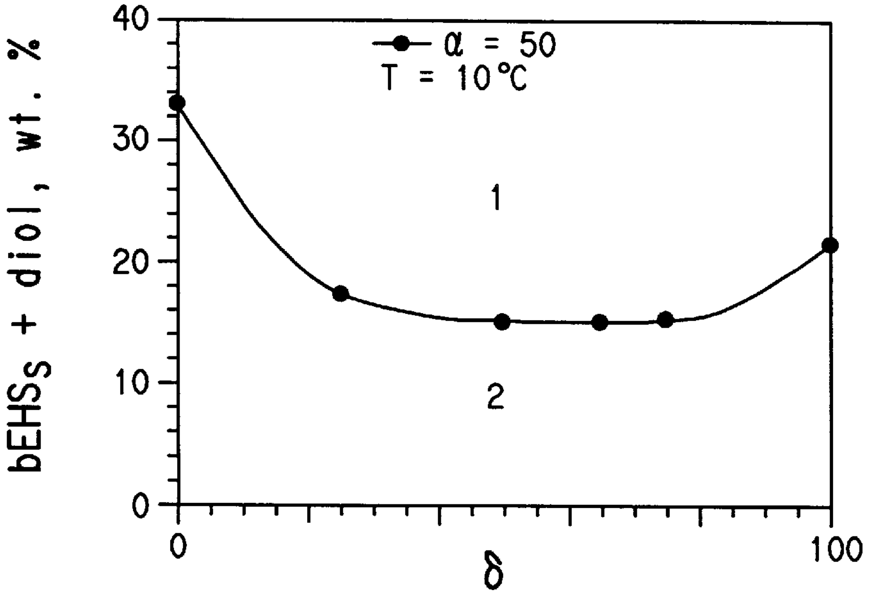
FIG. 2 shows a plot of the sum of the weight percent of surfactant plus diol as a function of $\delta$ at $\alpha$ equal to 50 and a temperature of 10° C.

FIG. 2 shows the minimum amount of surfactant and diol needed to form the microemulsion at 10° C. and $\alpha=50$. The region of the microemulsion is area marked 1 in the Figure.

Figure 3:
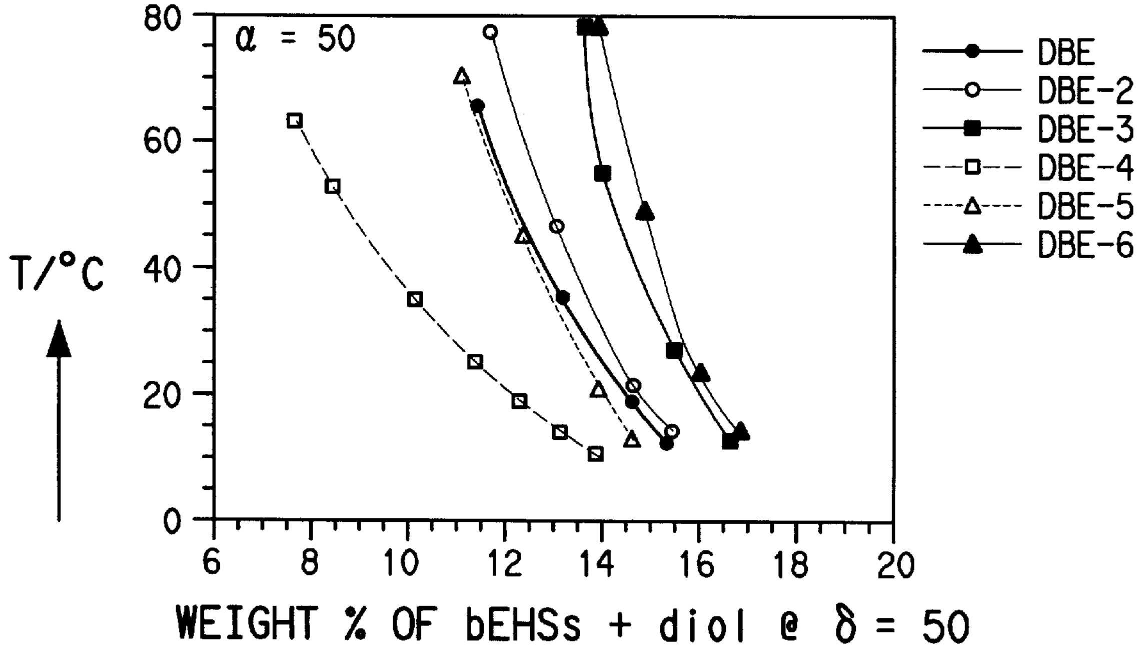
FIG. 3 shows the phase behavior for various DBE mixtures at $\alpha$=50 for temperatures from 0 to 80° C. as a function of the weight percent of surfactant plus diol at $\delta$ equals 50.

FIG. 3 shows the temperature phase behavior of the family of DBE's as-a function of the weight % of surfactant and diol in the mixture at $\delta=50$. In the case of each DBE product, the region of the microemulsion is the area to the right of the plotted phase boundary line. Each Figure illustrates the extensive compositional range of the microemulsion of the present invention.

A particular advantage of the present invention is that one can prepare microemulsions consisting of equal fractions of functionalized hydrocarbon and water making these microemulsions suitable for a variety of different applications. Formulations, that is mixtures of the microemulsions with organic solvents and/or other additives, formed from the microemulsion of the present invention can be used as effective replacements for organic solvents in applications such as paint stripping, degreasing, resin clean-up, aircraft and vehicle cleaning, electronic cleaning and other general cleaning applications.

Suitable diols for use in the present invention include those having from 2 to 10 carbon atoms, for example 1,2-butanediol(BD), 1,2-pentanediol(PD), 1,2-octanediol and 2-methyl-1,3-propanediol. Generally the preferred diol is 1,2-hexanediol, but in specific cleaning formulations other diols may be preferred over the hexanediol.

Example 2

This example illustrates a microemulsion containing water, DBE-5, 1,2-hexanediol and several commercial surfactants.

AY65 is a mixture of sodium diamylsulfosuccinate, water, ethanol and methanol. It was of interest to understand if the synergistic effect of the diol would be effected by the presence of the alcohol, especially ethanol since ethanol is a common diluent found in commercial surfactants. It was found that presence of ethanol in the commercial surfactant decreases the amount of hexanediol needed to form the microemulsion.

Comparison were made with a second commercial surfactant containing 78–80% sodium di(1,3-dimethyl butyl) sulfosuccinate, 5% isopropanol, and 16% water, sold under the MA-80-1 trademark of Cytec, Inc. Using shorter chained dihexyl surfactant instead of AOT marginally improves the efficiency in microemulsifying the water-DBE-5 mixtures.

GPG surfactant composed of sodium di(2-ethylhexyl) sulfosuccinate (66–72%), ethanol (7–9%) and water (19–27%), sold by Cytec under the trademark GPG was tested in the microemulsions of the present invention. Again the microemulsions showed were acceptable over the temperature range of 5 to 100° C. and were readily diluted by "oil" or water to form microemulsions having a broad range of compositions.

Example 3

This example illustrates the use of a thickener in the microemulsion of the present invention. The microemulsion made according to Example 1 was mixed with about 1% by weight of JR-400, an unmodified cationic cellulose ether polymer available as UCARE from Amerchol Corporation of Edison, N.J. When the additions of the thickener were below 1.25%, the mixture remained a clear single phase microemulsion. When the addition was above 1.5% by weight, a viscous emulsion was formed. These emulsions were stable for several days. The 1% JR-400 by weight thickened microemulsions had a zero shear viscosity of 0.2 Pa-s (200 times more viscous than water) measured using a Rheometrics Dynamic Stress Model SR500 rheometer.

Example 4

This example illustrates the addition of various organic solvents to the microemulsion. Base microemulsions were made by mixing 3.9 g of DBE, 1.2 g of Aerosol-OT, 3.9 g water, 0.5 g ethanol and 0.5 g 1,2-hexanediol. To each microemulsion 2.0 g of solvent, listed below, was mixed.

In each case, except for the Aromatic 150, the mixtures with solvent formed a single phase and were stable microemulsions over the range of 5 to 100° C.

The microemulsion formed including Aromatic 150 was stable from 20 to 75° C. At temperatures below 20° C., phase separation occurred.

| Solvent | Phase No. | T ° C. |
|---|---|---|
| NMP | 1 | 5–100 |
| dimethylpiperidone | 1 | 5–100 |
| dipropyleneglycol-monomethyl ether | 1 | 5–100 |
| propylene carbonate | 1 | 5–100 |
| Aromatic 150 | 1 | 20–75 |

Example 5

This example illustrates the utility of the microemulsion of the present invention in paint stripping. The microemulsion was formed by mixing a DBE, water, surfactant and diol to give the following composition by weight: 37.5% DBE, 37.5% water, 15% sodium bis(2-ethylhexyl) sulfosuccinate and 10% 2-methyl-1,3-propanediol.

A small amount (2–3 mL) of this microemulsion was placed on pine boards with the following surfaces for 60 minutes at 25° C.:

a) Marine Paint in three fully cured layers, a primer coating formed from Pettit Specialty Fiberglass Undercoat and first and second top coats formed from Pettit Easypoly High Gloss Marine Paint.

b) Marine Varnish applied in three fully cured coats of McCloskey Man-O-War Gloss Spar. The top two coats were thinned 20% prior to application.

After the 60 minutes, the samples were gently scraped with a flat metal spatula and the amount of paint removed was evaluated. In both cases, all layers of coating were removed.

Example 6

This example illustrates a degreasing composition using the microemulsion of the present invention.

A microemulsion prepared from 187.5 g DBE, 187.5 g water, 50.0 g Aromatic 150, 75.0 g sodium bis(2-ethylhexyl) sulfosuccinate, and 50.0 g 2-methyl-1,3-propanediol was tested for cleaning ability in the following fashion.

A 4" by ¼" stainless steel eye bolt was coated with a thin coating (approx. 0.1 g) of a soil. The eye bolt was immersed, except for the eye, in approx. 115 g of the above microemulsion for 10 minutes at room temperature with gentle magnetic stirring. The bolt was then rinsed with water by immersion for 10 minutes at room temperature and allowed to dry at room temperature for 24 hours. The bolt was then reweighed and the amount of soil removed relative to the initial amount was determined. This amount was compared to the amount removed by immersion in water alone for 10 minutes.

| | Weight % Removed | |
|---|---|---|
| Soil | by water | by microemulsion |
| Conoco HD Calcium Grease No. 2 | 0.6% | 17.0% |
| Petroleum Jelly | 1.1% | 16.5% |
| Shell Alvania Grease No. 2 | 0.0% | 32.3% |
| Sta-Lube Lithium Purpose Grease No. 2 | 0.0% | 41.2% |

Example 7

This example illustrates another degreasing formulation using the microemulsion of the present invention. The formulation was made as described below and tested as described in Example 6. Data shown below is for the weight removed by the formulation. The weight removed by water is the same as shown in the table in Example 6.

A microemulsion was prepared from 115.5 g DBE, 115.6 g water, 77.0 g d-limonene, 46.2 g sodium bis(2-ethylhexyl) sulfosuccinate, and 30.8 g 2-methyl-1,3-propanediol.

| Soil | Weight Removed, % |
|---|---|
| Conoco HD | 20.2 |
| Petroleum Jelly | 55.4 |
| Shell ALVANIA | 63.1 |
| Sta-Lube Lithium Grease | 81.3 |

Example 8

This Example illustrates the utility of neopentyl glycol in a microemulsion of the present invention.

A microemulsion was formed by mixing 56.4 grams of DBE, 30 grams of MACKANATE DOS-75 (MACKANATE is a trademark of the McIntyre Group Ltd. of University Park, Ill.; the DOS-75 product is a mixture of sodium bis(2-ethylhexyl)sulfo-succinate, water, ethanol and propylene glycol), 13.5 grams of neopentyl glycol and 50.4 grams of water. The components mixed together easily with stirring to form a clear microemulsion.

Example 9

This Example illustrates the utility of 2-methyl-2,4-pentanediol (commonly known as hexylene glycol) as the diol in a microemulsion of the present invention.

A microemulsion was prepared from mixing together 4.0 grams of DBE 1.0 gram of MACKANATE DOS-75, 1.0 gram of 2-methyl-2,4-pentanediol, and 4 grams of water. The components mixed together easily with stirring to form a clear microemulsion.

Example 10

This Example illustrates the utility of PEMULEN, a polyacrylic acid, in thickening the microemulsions of the present invention. PEMULEN is a trademark of the B. F. Goodrich Company of Cleveland, Ohio.

A microemulsion was prepared by mixing 3.36 grams of DBE, 1.0 grams of NMP, 1,79 grams of MACKANATE DOS-75, 0.81 grams of neopentyl glycol and 3 grams of water. To this microemulsion was added 0.3 grams of PEMULEN 1622. The resulting combination was stirred vigorously using a magnetic stirrer until it became uniform, clear and extremely viscous. Approximately 2 grams of this thickened formulation was placed on a vertical surface and observed for a period of 60 minutes. During the observation time the formulation remained in its original position on the surface without showing any evidence of downward flow.

Example 11

This Example shows the use of the formulation of Example 10 in paint stripping.

A portion of the Example 10 formulation was placed on a pine board which was coated with Marine paint as described in Example 5. The board was held vertically for 60 minutes, the sample of the formulation was then removed by gently scraping the surface of the board with a flat metal spatula.

All layers of the paint were removed.

What is claimed is:

1. A microemulsion comprising:

(a) water, (b) a functionalized hydrocarbon, (c) an anionic surfactant, and (d) a diol having from 2 to 10 carbon atoms wherein the functionalized hydrocarbon is sparingly soluble in water over the entire stability range of the microemulsion and is present at an amount in excess of its water solubility and wherein the functionalized hydrocarbon is selected from the group consisting of esters of adipic, glutaric and succinic acids and alcohols having from 1 to 12 carbons and mixtures of these esters and wherein the surfactant is a sodium salt of a sulfosuccinate and wherein the hydroxyl groups of the diol are bonded to adjacent carbon atoms or carbon atoms separated by one carbon atom.

2. The microemulsion of claim 1 wherein the functionalized hydrocarbon is selected from the dimethyl esters of adipic, glutaric and succinic acids and mixtures of these esters.

3. The microemulsion of claim 1 further comprising an organic solvent, the organic solvent being mixed with the microemulsion to form a mixture wherein the weight ratio of microemulsion to organic solvent is such that the mixture is a microemulsion.

4. The microemulsion of claim 3 wherein the solvent is selected from the group consisting of alcohols, ketones, esters, acyclic amides, cyclic amides, glycol ethers, acetates, glycol ether acetates, lactones, sulfoxides, cyclic carbonates, aromatic hydrocarbons, terpenes, N-methylpyrrolidone and other N-alkyl pyrrolidones, dimethylpiperidone, dipropylene glycol monomethyl ether, propylene carbonate, alkylbenzenes, d-limonene and mixtures of any combination of these compounds.

5. The microemulsion of claim 1 wherein the diol is selected from the group consisting of 1,2-hexanediol, 2-methyl-1,3-propanediol, neopentyl glycol and 2-methyl-2,4-pentanediol, hexanediols, octanediols, 1,2,3-propanetriol monoacetate, heptanediols, decanediols and 2-methyl-1,3-propanediol.

6. The microemulsion of claim 1 further comprising a thickener selected from the group consisting of unmodified and hydrophobically modified cationic cellulose ether polymers, polyurethanes, and polyacrylics and polyacrylic acids.

7. A microemulsion comprising:

(a) water, (b) a functionalized hydrocarbon, (c) an anionic surfactant, and (d) a diol having from 2 to 10 carbon atoms wherein the functionalized hydrocarbon is sparingly soluble in water over the entire stability range of the microemulsion and is present at an amount in excess of its water solubility and wherein the surfactant is sodium bis(2-ethylhexyl) sulfosuccinate, the diol is 1,2-hexanediol and the functionalized hydrocarbon is selected from the group consisting of esters of adipic, glutaric and succinic acids and alcohols having from 1 to 12 carbons and mixtures of these esters.

8. A microemulsion comprising:

(a) water, (b) a functionalized hydrocarbon, (c) an anionic surfactant, and (d) a diol having from 2 to 10 carbon atoms wherein the functionalized hydrocarbon is sparingly soluble in water over the entire stability range of the microemulsion and is present at an amount in excess of its water solubility and wherein the surfactant is sodium bis(2-ethylhexyl) sulfosuccinate, the diol is selected from the group consisting of neopentyl glycol and 2-methyl-2,4-pentanediol and the functionalized hydrocarbon is selected from the group consisting of esters of adipic, glutaric and succinic acids and alcohols having from 1 to 12 carbons and mixtures of these esters.

9. A microemulsion comprising:

(a) water, (b) a functionalized hydrocarbon, (c) an anionic surfactant, and (d) a diol having from 2 to 10 carbon atoms wherein the functionalized hydrocarbon is sparingly soluble in water over the entire stability range of the microemulsion and is present at an amount in excess of its water solubility and wherein the surfactant is selected from the group consisting of the sodium salts of bis(2-ethylhexyl) sulfosuccinate, di(1,3-dimethylbutyl)sulfosuccinate, and diamylsulfosuccinate.

10. A microemulsion comprising:

(a) water, (b) a functionalized hydrocarbon, (c) an anionic surfactant, (d) a diol having from 2 to 10 carbon atoms, and (e) a thickener selected from the group consisting of unmodified and hydrophobically modified cationic cellulose ether polymers polyurethanes, and polyacrylics and polyacrylic acids;

wherein the functionalized hydrocarbon is sparingly soluble in water over the entire stability range of the microemulsion and is present at an amount in excess of its water solubility and wherein the surfactant is sodium bis(2-ethylhexyl) sulfosuccinate, the diol is selected from the group consisting of 1,2-hexanediol, neopentyl glycol and 2-methyl-2,4-pentanediol and the functionalized hydrocarbon is selected from the group consisting of esters of adipic, glutaric and succinic acids and alcohols having from 1 to 12 carbons and mixtures of these esters.

11. A cleaning composition comprising a microemulsion, an organic solvent and optionally a thickener wherein the microemulsion contains:

(a) water, (b) a functionalized hydrocarbon, (c) an anionic surfactant, (d) a diol having from 2 to 10 carbon atoms wherein the functionalized hydrocarbon is sparingly soluble in water over the entire stability range of the microemulsion and is present at an amount in excess of its water solubility and wherein surfactant is sodium bis(2-ethylhexyl) sulfosuccinate, the diol is selected from the group consisting of 1,2-hexanediol, 2-methyl-1,3-propanediol, neopentyl glycol and 2-methyl-2,4-pentanediol, the functionalized hydrocarbon is selected from the group consisting of esters of adipic, glutaric and succinic acids and alcohols having from 1 to 12 carbons and mixtures of these esters, the solvent is selected from the group consisting of alcohols, ketones, esters, acyclic amides, cyclic amides, glycol ethers, acetates, glycol ether acetates, lactones, sulfoxides, cyclic carbonates, aromatic hydrocarbons, terpenes, N-methylpyrrolidone and other N-alkyl pyrrolidones, dimethylpiperidone, dipropylene glycol monomethyl ether, propylene carbonate, alkylbenzenes, d-limonene and mixtures of any combination of these compounds.

12. The cleaning composition of claim 11 wherein the functionalized hydrocarbon is selected from the dimethyl esters of adipic, glutaric and succinic acids and mixtures of these esters and the solvent is d-limonene.

13. The cleaning composition of claim 11 wherein the functionalized hydrocarbon is selected from the dimethyl esters of adipic, glutaric and succinic acids and mixtures of these esters and the solvent is an alkyl benzene or mixtures of alkyl benzenes.

14. A cleaning composition comprising a microemulsion, an organic solvent and a thickener; wherein the thickener is selected from the group consisting of unmodified and hydrophobically modified cationic cellulose ether polymers, polyurethanes and polyacrylics and polyacrylic acids and wherein the microemulsion contains:

(a) water, (b) a functionalized hydrocarbon, (c) an anionic surfactant, and (d) a diol having from 2 to 10 carbon atoms wherein the functionalized hydrocarbon is sparingly soluble in water over the entire stability range of the microemulsion and is present at an amount in excess of its water solubility and wherein the functionalized hydrocarbon is selected from the group consisting of esters, diesters, triesters, tetraesters, acetates and diacetates, and lactones and wherein the surfactant is a sodium salt of a sulfosuccinate and wherein the hydroxyl groups of the diol are bonded to adjacent carbon atoms or carbon atoms separated by one carbon atom.

15. A cleaning composition comprising a microemulsion, an organic solvent and optionally a thickener wherein the microemulsion contains:

(a) water, (b) a functionalized hydrocarbon, (c) an anionic surfactant, and (d) a diol having from 2 to 10 carbon atoms wherein the functionalized hydrocarbon is sparingly soluble in water over the entire stability range of the microemulsion and is present at an amount in excess of its water solubility and wherein the surfactant is sodium bis(2-ethylhexyl) sulfosuccinate, the diol is 2-methyl-1,3-propanediol and the functionalized hydrocarbon is selected from the group consisting of esters of adipic, glutaric and succinic acids and alcohols having from 1 to 12 carbons and mixtures of these esters.

16. A cleaning composition comprising a microemulsion, an organic solvent and optionally a thickener wherein the microemulsion contains:

(a) water, (b) a functionalized hydrocarbon, (c) an anionic surfactant, and (d) a diol having from 2 to 10 carbon atoms wherein the functionalized hydrocarbon is sparingly soluble in water over the entire stability range of the microemulsion and is present at an amount in excess of its water solubility and wherein the surfactant is sodium bis(2-ethylhexyl) sulfosuccinate, the diol is neopentyl glycol or 2-methyl-2,4-pentanediol, and the functionalized hydrocarbon is selected from the group consisting of esters of adipic, glutaric and succinic acids and alcohols having from 1 to 12 carbons and mixtures of these esters, the solvent is N-methylpyrrolidone and the thickener is a polyacrylic acid.

* * * * *